(12) United States Patent
Rochester

(10) Patent No.: US 11,841,007 B1
(45) Date of Patent: Dec. 12, 2023

(54) MAGNETIC PROPULSION APPARATUS

(71) Applicant: Castlewood Development Inc., Tomball, TX (US)

(72) Inventor: George Rochester, Tomball, TX (US)

(*) Notice: Subject to any disclaimer, the term of this patent is extended or adjusted under 35 U.S.C. 154(b) by 0 days.

(21) Appl. No.: 17/824,161

(22) Filed: May 25, 2022

(51) Int. Cl.
*F03G 7/00* (2006.01)
*F03G 7/10* (2006.01)

(52) U.S. Cl.
CPC ............ *F03G 7/0252* (2021.08); *F03G 7/10* (2013.01)

(58) Field of Classification Search
CPC .................................................. F03G 7/10–135
See application file for complete search history.

(56) References Cited

U.S. PATENT DOCUMENTS

2012/0267973 A1* 10/2012 Ariel ...................... H02K 53/00
310/74

OTHER PUBLICATIONS

Simanek, Donald. "The Simplest Magnetic Motor." The Museum of Unworkable Devices Annex. Captured Feb. 14, 2020 via archive. org, https://web.archive.org/web/20200214091838/http://lockhaven.edu/~dsimanek/museum/magwheel.htm (Year: 2020).*
Simanek, Donald. "The Even Simpler Magnetic Motor." The Museum of Unworkable Devices Annex. Captured Feb. 14, 2020 via archive.org, https://web.archive.org/web/20200214091835/http://lockhaven.edu/~dsimanek/museum/horsemag.htm (Year: 2020).*
"Magnet Motor." Wikipedia, Captured May 6, 2021 via archive.org, https://web.archive.org/web/20210506165650/https://en.wikipedia.org/wiki/Magnet_motor (Year: 2021).*

* cited by examiner

*Primary Examiner* — Laert Dounis
(74) *Attorney, Agent, or Firm* — Phillip Black

(57) ABSTRACT

A magnetic motor apparatus provides increased mechanical output. The apparatus includes a propulsion unit positioned in a guide sleeve adjacent a stabilizer section. A stabilizer section frame houses a drive gear and gearbox positioned on opposite interior surfaces of the frame. The gear and gearbox receive mechanical input from a drive shaft rotationally disposed in the gear and gearboxes. The mechanical input is then transferred to first and second threaded gears of the propulsion unit. Each of the first and second threaded gears are affixed to a respective one of a first and second translatable cylinder. Sets of magnets each impregnated on faces of the first and second translatable cylinders are disposed facing one another. Rotation of the drive shaft provides a mechanical input to the first and second translatable cylinders that are configured to actuate continuous propulsion from the interactions of the magnets while travelling along a threaded shaft.

17 Claims, 3 Drawing Sheets

MAGNETIC PROPULSION APPARATUS

FIELD OF THE INVENTION

The present invention is directed to a magnetic motor apparatus having a magnetic propulsion unit for achieving high mechanical output.

BACKGROUND OF THE INVENTION

Magnets have been utilized for years in compound machines created and manufactured for industrial purposes. They are especially appealing due to the emission of attractive and repulsive forces that can provide unique functionality to compound machines that otherwise would not be possible. Functions such as friction reduction, levitation, and increased work efficiency are fairly common among devices that employ some type of magnet or magnetic device.

Many compound machines, when employing materials such as magnets, also employ electricity. This may increase the overall output of the machine however, exposure to electricity can cause a magnet to demagnetize in certain cases. For example, in the case of magnetic motors, magnets may be exposed to large armature currents when a magnetic motor is run, which may demagnetize the poles of the magnets, making the magnets weaker. Magnets may also degrade due to excessive vibration and/or heat. Inside of an engine, excessive vibration and heat are commonplace; for a material that has a brittleness more similar to a rock than a metal, an engine's interior can be a destructive place.

In addition to physical constraints, magnetic motors also suffer from monetary drawbacks such as high material/construction costs. Accordingly, a need exists for a simple and efficient motor apparatus for utilizing magnets to create high mechanical output.

BRIEF SUMMARY OF THE INVENTION

The disclosed subject matter provides a magnetic motor apparatus. The apparatus comprises a stabilizer section having a frame including first and second side sections and an end section. The stabilizer section may further include a first driver gear positioned adjacent one of the first and second side sections, a gearbox positioned adjacent the other of the first and second side sections, and a drive shaft rotationally disposed in the first and second side sections, the first driver gear, and the gearbox. A propulsion unit is positioned in a guide sleeve positioned adjacent the stabilizer section. The propulsion unit includes a pair of translatable cylinders each having threaded gears in interlocking engagement with the aforementioned first drive gear and gearbox. Each of the translatable cylinders may comprise a plurality of magnets spaced apart from one another on first faces of each of the translatable cylinders. In order to have the apparatus work properly, the first face of the first translatable cylinder may face the first face of the second translatable cylinder so that each of the plurality of magnets is capable of interacting with one another. A threaded shaft rotationally disposed in the first and second translatable cylinders is in interlocking engagement with at least the first threaded gear and the second threaded gear in order that the threaded shaft receive mechanical input from the rest of apparatus.

Rotation of the drive shaft provides a mechanical input to the first and second translatable cylinders that are configured to actuate continuous propulsion from the interactions of the magnets while travelling along a threaded shaft.

An additional embodiment is disclosed for triggering an exponential energy output. The apparatus comprises a frame including first and second side sections and an end section. First and second gear trains are positioned adjacent interior surfaces of the first and second side sections; each gear train comprises a respective one of a pair of threaded gears as well as a respective one of a pair of driver gears. A drive shaft is rotationally disposed in the first and second side sections, the first gear train, and the second gear train.

First and second translatable cylinders may each be affixed to a respective one of the pair of threaded gears. This configuration may allow the first and second translatable cylinders to receive rotational energy from the pair of threaded gears. Each of the first and second translatable cylinders may also comprise a plurality of magnets each spaced apart from one another on faces of the first and second translatable cylinder that face one another. A threaded shaft may interlockingly engage with the first threaded gear and the second threaded gear so that the motor apparatus may translate along the threaded shaft. First gear train and second gear train may be positioned as stated to allow interaction of the magnetic fields of the first plurality of magnets with the magnetic fields of the second plurality of magnets in order to create continuous propulsion actuated by a mechanical input.

BRIEF DESCRIPTION OF THE DRAWINGS

The disclosed subject matter, objectives, and advantages thereof, will best be understood by reference to the following detailed description of an illustrative embodiment when read in conjunction with the accompanying drawings, wherein.

DETAILED DESCRIPTION

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
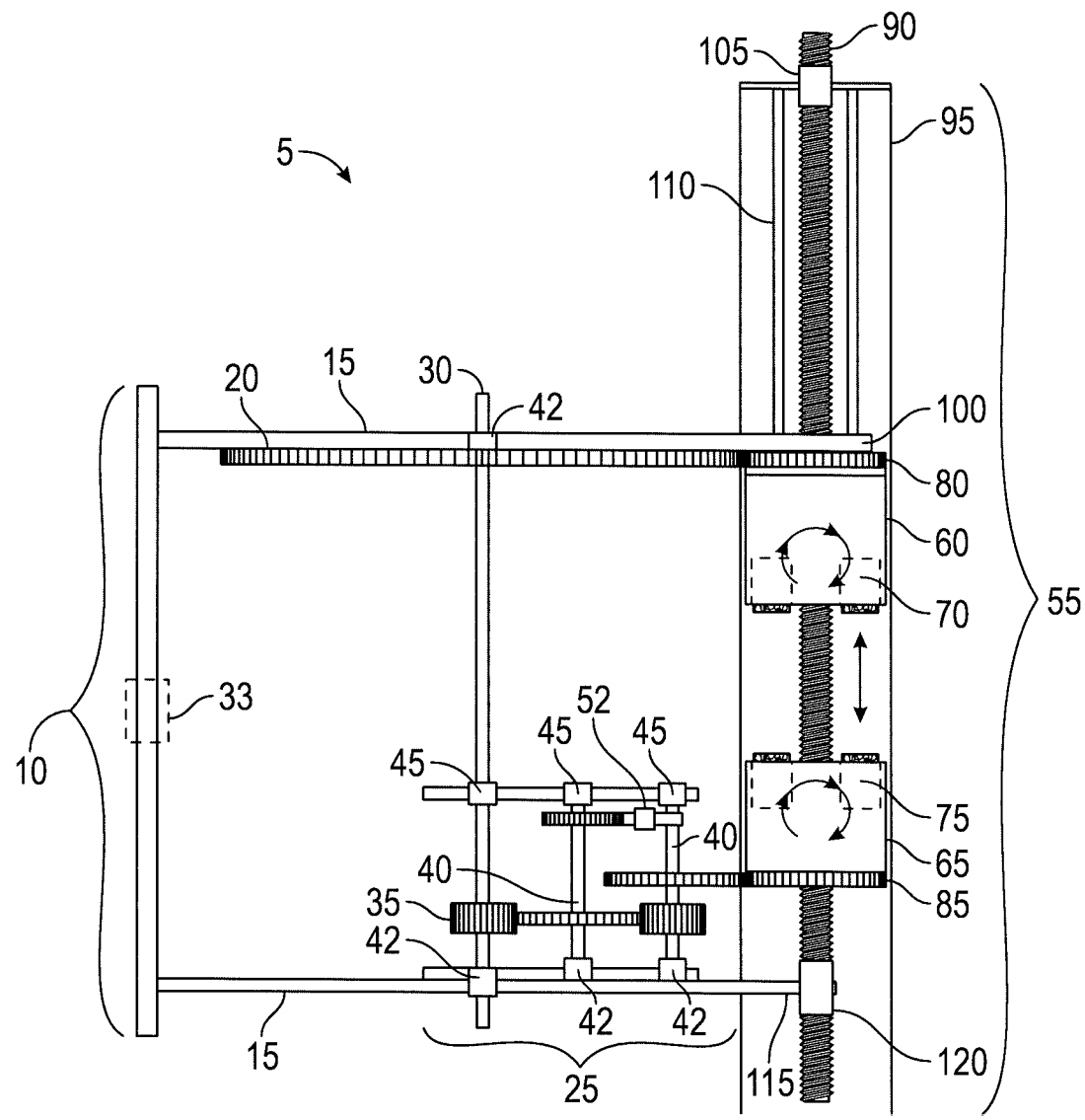
FIG. 1 displays a partial cross-sectional side view of a magnetic motor apparatus, as shown and described herein.

FIG. 1 displays a partial cross-sectional side view of a magnetic motor apparatus 5, as shown and described herein. Magnetic motor apparatus 5 is configured to receive a mechanical input and use the mechanical input to trigger the interaction of magnetic fields between sets of magnets 70,75 to rotate around one another, leading to the propulsion of elements associated with the magnets 70,75. Apparatus 5 may include a stabilizer section 10 having a frame 15 including first and second side sections and an end section affixed to the first and second side sections opposite a guide sleeve 95. End section, in embodiments, may include a sleeve 33 configured to receive and stabilize a control arm. Control arm (not depicted) may be utilized in a scenario where stabilizer section 10 is configured to move in a direction perpendicular to the ground (apparatus 5 is in an upright and vertical position). The configuration may include the control arm connected to a channel in the stabilizer section 110 and sleeve 33 affixing the control arm to a roller carriage attached to a roller carriage guide on stabilizer section 10. The roller carriage guide may provide an additional degree of freedom to the control arm.

A drive gear 20 and gearbox 25 may each be positioned adjacent an interior surface of one of the first and second side sections. Drive shaft 30 may be rotationally disposed in first and second side sections, gear 20, and gearbox 25 (specifically, reduction gear 35). Torque applied to drive shaft 30 may cause first drive gear 20 and second drive gear 35 to rotate simultaneously. When drive shaft 30 is rotated, the resulting mechanical energy produced is transferred from the drive shaft 30 to the drive gear and reduction gear 20,35 and ultimately to first and second threaded gears 80,85 (by way of a plurality of gear shafts 40 for the reduction gear 35 and the second threaded gear 85), which are a part of propulsion unit 55. As shown, reduction gear 35 may actuate a reduction gear drive (plurality of directly interacting gears within gearbox 25) that may deliver increased torque to second threaded gear 85 that may propel second translatable cylinder 65 toward first translatable cylinder 60 faster than the speed at which first translatable cylinder 60 is traveling, creating a higher gear ratio and thus increasing the output of propulsion unit 55.

Propulsion unit 55 is positioned adjacent stabilizer section 10 and includes a pair of translatable cylinders 60,65. A first translatable cylinder 60 includes a first threaded gear 80 in interlocking engagement with drive gear 20 while a second translatable cylinder 65 includes a second threaded gear 85 in interlocking engagement with gearbox 25. A first plurality of magnets 70 may be positioned on a first face of the first translatable cylinder 60 (with each magnet 70 spaced apart from one another along the face) while a second plurality of magnets 75 may be positioned on a first face of the second translatable cylinder 65 (again, with each magnet 75 spaced apart from one another along the face). Each of the pair of faces face one another so that the first plurality of magnets 70 interacts with the second plurality of magnets 75 to create propulsion.

A threaded shaft 90 is rotationally disposed in the first translatable cylinder 60 and the second translatable cylinder 65; in this case, threaded shaft 90 may act as a track for the rest of propulsion unit 55. Additionally, threaded shaft 90 is in interlocking engagement with at least first threaded gear 80 and second threaded gear 85 so that the mechanical input from the rotating drive shaft 30 passes through drive gear 20 and the gearbox 25 to threaded shaft 90. When this is carried out, mechanical input is received by the first and second translatable cylinders 60,65, causing them to rotate along threaded shaft 90. Furthermore, the mechanical input is configured to actuate continuous propulsion from the interaction of the first plurality of magnets 70 with the second plurality of magnets 75. In order to carry this out, a large enough rotational energy should be received by the first and second threaded gears 80,85, via the drive shaft 30. This input may push the magnetic fields of the first and second pluralities of magnets 70,75 past each other to create a continuous mechanical output. In addition, it is understood that when in an engaged configuration, drive shaft 30 may be substantially parallel to threaded shaft 90.

In embodiments, the interface between drive shaft 30 and each of the first and second sides of frame 15 comprise an outer ball bearing 42 so that drive shaft 30 is stabilized and friction is reduced between drive shaft 30 and frame 15. The interface between drive gear 20 and a respective one of the outer ball bearings 42 may include a spacer (not depicted) configured to reduce friction between drive gear 20 and frame 15. In addition, an inner ball bearing 45 may be positioned within the frame of gearbox 25 in order to stabilize drive shaft 30 and also to reduce friction between drive shaft 30 and gearbox 25.

In embodiments, the interface between first and second ends of gear shafts 40 and each of the first and second sides of gearbox 25 comprise respective outer and inner ball bearings 42,45 so that gear shafts 40 are stabilized and friction is reduced between gear shafts 40 and gearbox 25.

It is noted that when apparatus 5 is in a state ready to be used, portions of the magnetic fields of the first and second plurality of magnets 70,75 may overlap in a common area of space (between first and second translatable cylinders 60,65). When rotated against one another, the magnetic fields associated with the first plurality of magnets 70 may rotate past one another and cause shear forces of the magnetic fields of each of the pluralities of magnets 70,75 to interact with one another (while spinning in the same direction), propelling the first and second translatable cylinders 60,65 along threaded shaft 90 once first and second threaded gears 80,85 cease to be driven by drive shaft 30. This may create a continuous mechanical output from a mechanical input (from drive shaft 30). It is noted that once apparatus 5 is in the continuous mechanical output state (or "in motion"), apparatus 5 may run continuously until one or more of the components of apparatus 5 wears out or breaks. This may imply that friction is the main factor reducing the efficiency of apparatus 5.

In the embodiment as shown in FIG. 1, gearbox 25 may include a stop latch 50. Stop latch 50 may be utilized by an individual in order to make a non-stationary apparatus 5 stationary again. Stop latch 50 may be affixed to one of the gear shafts 40 and may also be positioned engaging any of the gears affixed to any of the other gear shafts 40 (other than the gear shaft 40 stop latch 50 is affixed to). The biasing may be provided by a biasing mechanism such as, for example, an extension spring, affixed to the stop latch 50 and/or associated gear shaft 40. In other embodiments, stop latch may be rotatably affixed to its associated gear shaft so that latch 50 is able to engage a gear of gearbox 25 in a way that allows the gear to rotate in one direction and restricts movement in the other.

It is noted that in embodiments, propulsion unit 55 may comprise first and second translatable cylinders 60,65 and first and second threaded gears 80,85. In other embodiments, propulsion unit 55 may also comprise threaded shaft 90 in addition to the elements mentioned above.

As further shown in FIG. 1, upper conduit 105 and lower conduit 120 assist in guiding and stabilizing propulsion unit 55. Upper conduit 105 is affixed to an upper conduit frame 110 that extends from an upper protruding lip 100 of frame 15. Lower conduit 120 is affixed to a lower protruding lip 115 below second threaded gear 85 and is positioned distal to the first and second translatable cylinders 60,65.

An alternative embodiment of apparatus 5 is provided for triggering an exponential energy output. Apparatus 5 includes a frame having first and second side sections and an end section. A first gear train including drive gear 20 and first threaded gear 80 is positioned adjacent an interior surface of a respective one of the first and second side sections. A second gear train (including reduction gear 35, gear shafts 40, and second threaded gear 85) is positioned adjacent an interior surface of the other of the first and second side sections. Drive shaft 30 is rotationally disposed in the first and second side sections, the first gear train, and the second gear train so that not only is drive shaft 30 securely positioned within the first and second side sections, but drive shaft 30 also provides mechanical input to the rest of apparatus 5.

Similar to the embodiment aforementioned previously, apparatus 5 includes a drive shaft 30, first and second translatable cylinders 60,65, and a threaded shaft 90 that all share characteristics similar to those presented in the aforementioned embodiment. In relation to this embodiment, the first gear train and the second gear train are positioned so as to allow interaction of magnetic fields of the first plurality of magnets with magnetic fields of the second plurality of magnets in order to create continuous propulsion that is actuated by mechanical input (from drive shaft 30).

In embodiments, the first gear train may comprise drive gear 20 and first threaded gear 80 and the second gear train may comprise reduction gear 35, the gears found on each of the plurality of gear shafts 40, and second threaded gear 85.

In embodiments, the couplable threading mechanism positioned on the outer surface of threaded shaft 90 and on the interior surface of first and second threaded gear 80,85 (and/or first and/or second translatable cylinders 65,70) may be configured as a ball screw mechanism. At least one of the first threaded gear 80, the second threaded gear 85, the first translatable cylinder 65, and the second translatable cylinder 70 may include a plurality of organized spheres positioned around the interior diameter of the gears and/or cylinders 65,70,80,85. When the gears and/or cylinders 65,70,80,85 engage threaded shaft 90, the gears and/or cylinders 65,70, 80,85 may traverse the circumference of threaded shaft 90 when threaded shaft 90 and the gears and/or cylinders 65,70,80,85 are engaged and torque is applied to at least one of the threaded shaft 90 and/or the gears and/or cylinders. The reduction of contact area between threaded shaft 90 and the gears and/or cylinders 65,70,80,85 using the spheres reduces the frictional force between the parts, allowing for a higher mechanical output.

Figure 2A:
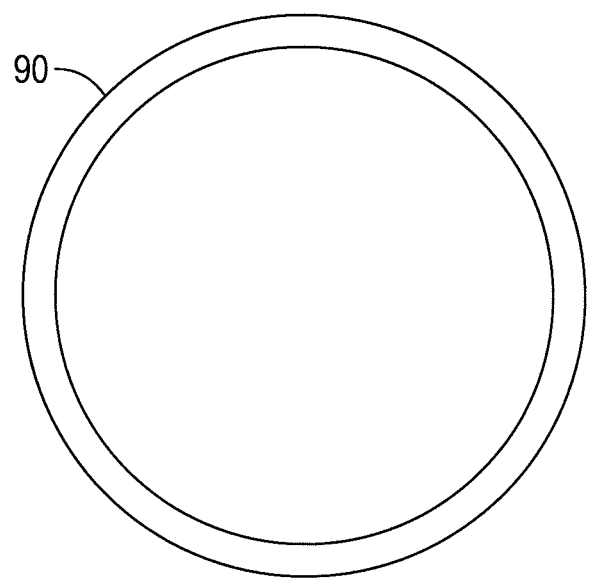
FIG. 2A displays a cross-sectional view of a guide sleeve of a magnetic motor apparatus, as shown and described herein.
Figure 2B:
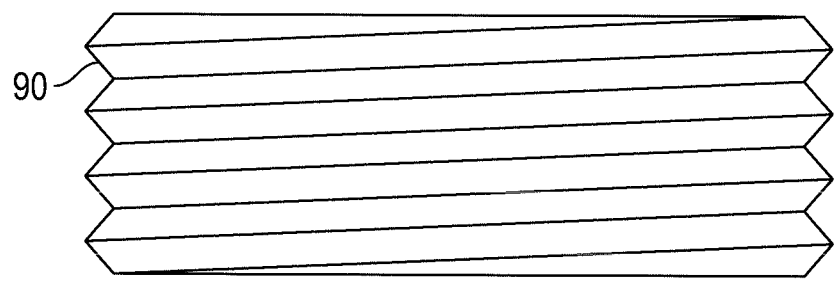
FIG. 2B displays a side view of a portion of a guide sleeve of a magnetic motor apparatus, as shown and described herein.

FIG. 2A displays a cross-sectional view of a threaded shaft 90 of a magnetic motor apparatus 5, as shown and described herein. As shown, threaded shaft 90 comprises a circular cross section and may house and assist in guiding propulsion unit 55 along threaded shaft 90. As shown in FIG. 2B, a side view of threaded shaft 90 is shown, depicting the threaded construction of the body of threaded shaft 90. In certain embodiments, threaded shaft 90 may comprise at least one of metal and ceramic.

In embodiments, a majority of the components that make up magnetic motor apparatus 5 may be made exclusively of steel.

In an embodiment, components of the magnetic motor apparatus 5 may include specific widths and diameters. For example, magnetic motor apparatus 5 may include at least one of the following: a drive gear 20 comprising an outer diameter of 8 inches and a width of 0.375 inches, a reduction gear 35 comprising an outer diameter of 1 inch and a width of 0.375 inches, a first threaded gear 80 comprising an outer diameter of 2.417 inches and a width of 0.375 inches, and a second threaded gear 85 comprising an outer diameter of 2.417 inches and a width of 0.375 inches.

In embodiments, at least one gear in gearbox 25 and the first and second threaded gears 80,85 may each comprise an outer diameter of 2.417 inches and a width of 0.375 inches. In other embodiments, reduction gear 35 and at least another of the gears in gearbox 25 may each comprise an outer diameter of 1 inch and a width of 0.375 inches.

In embodiments, guide sleeve 95 may comprise an inner diameter of 2.5 inches. In other embodiments, guide sleeve 95 may comprise an outer diameter of 48 inches.

As further shown in FIG. 1, upper conduit 105 and lower conduit 120 assist in guiding and stabilizing propulsion unit 55. Upper conduit 105 is affixed to an upper conduit frame 110 that extends from an upper protruding lip 100 of frame 15. Lower conduit 120 is affixed to a lower protruding lip 115 below second threaded gear 85 and is positioned distal to the first and second translatable cylinders 60,65.

Figure 3:
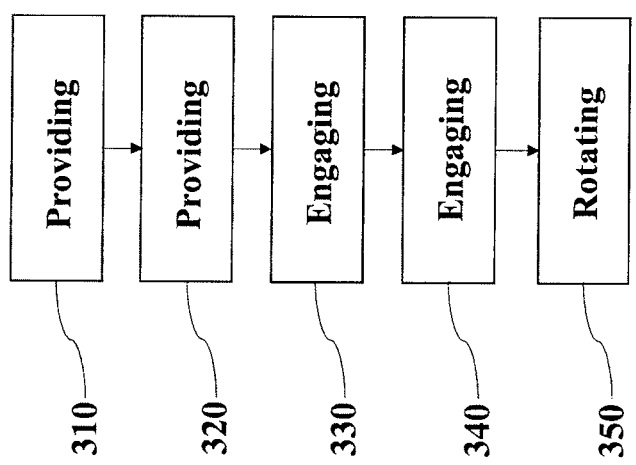
FIG. 3 displays a method for creating an extended and continuous output from a single input, as shown and described herein.

FIG. 3 displays a method 300 for creating an extended and continuous output from a single input, as shown and described. Method 300 may include providing 310 a propulsion unit 55. Propulsion unit 55 (as used in relation to method 300) may be similar to or the same as the disclosed structure of propulsion unit 55 (including first translatable cylinder 60, second translatable cylinder 65, threaded shaft 90, first plurality of magnets 70, and second plurality of magnets 75). A drive shaft 30 may also be provided 320 that may be positioned substantially parallel to threaded shaft 90 of propulsion unit 55. Structurally, drive shaft 30 may include a drive gear 20 positioned at a first end and a gearbox 25 positioned at a second end. Once the components have been provided, first translatable cylinder 60 may engage 330 drive gear 20 while second translatable cylinder 65 may engage 340 gearbox 25. When the components are engaged 330,340, drive shaft 30 may be rotated 350. Rotation 350 of the drive shaft 30 may provide a mechanical input to the first and second translatable cylinders 60,65 that are configured to actuate continuous propulsion from the interaction of the first plurality of magnets 70 with the second plurality of magnets 75.

For the purposes of this disclosure, it is noted that first/second side section of stabilizer section 10 includes an upper protruding lip 100 positioned adjacent first threaded gear 80. Protruding lip 100 is configured to provide stability to a portion of propulsion unit 55 including first threaded gear 80 and first translatable cylinder 60, whereas second threaded gear 85 and second translatable cylinder 65 lack a support structure besides the rightmost gear in gearbox 25.

For the purposes of this disclosure, the terms "rotational energy" and "mechanical input" may be synonymous.

For the purposes of this disclosure, the terms "rotational energy" and "mechanical output" may be synonymous.

A plurality of additional features and feature refinements are applicable to specific embodiments. These additional features and feature refinements may be used individually or in any combination. It is noted that each of the following features discussed may be, but are not necessary to be, used with any other feature or combination of features of any of the embodiments presented herein.

Unless otherwise defined, all technical and scientific terms used herein have the same meanings as are commonly understood by one of ordinary skill in the art to which this disclosure belongs. Although methods similar or equivalent to those described herein can be used in the practice or testing of the present disclosure, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present disclosure is not limited to what has been particularly shown and described hereinabove. Rather, the scope of the present disclosure is defined by the appended claims and includes both combinations and sub-combinations of the various features described hereinabove as well as variations and modifications thereof, which would occur to persons skilled in the art upon reading the foregoing description.

I claim:

1. A magnetic propulsion apparatus, comprising:
   a stabilizer section having a frame including first and second side sections and an end section, the stabilizer section further including:
      a drive gear positioned adjacent an interior surface of a respective one of the first and second side sections;
      a gearbox positioned adjacent an interior surface of an other of the first and second side sections; and
      a drive shaft rotationally disposed in the first and second side sections, the first drive gear, and the gearbox;
   a propulsion unit comprising:
      a first translatable cylinder having a first threaded gear in interlocking engagement with the drive gear, the first translatable cylinder comprising a first plurality of magnets each spaced apart from one another on a first face of the first translatable cylinder;
      a second translatable cylinder having a second threaded gear in interlocking engagement with the gearbox, the second translatable cylinder comprising a second plurality of magnets each spaced apart from one another on a first face of the second translatable cylinder, the first face of the second translatable cylinder positioned to face the first face of the first translatable cylinder; and
      a threaded shaft rotationally disposed in the first translatable cylinder and the second translatable cylinder, the threaded shaft in interlocking engagement with at least the first threaded gear and the second threaded gear; and
   wherein rotation of the drive shaft provides a mechanical input to the first and second translatable cylinders configured to actuate the propulsion from the interaction of the first plurality of magnets with the second plurality of magnets.

2. The apparatus of claim 1, further comprising a guide sleeve extending along a length of the threaded shaft.

3. The apparatus of claim 1, wherein the drive shaft is substantially parallel to the threaded shaft.

4. The apparatus of claim 1, wherein the interface between the drive shaft and each of the first and second side sections comprise a ball bearing, further wherein the interface between the drive gear and a respective one of the ball bearings includes a spacer configured to reduce friction between the drive gear and the frame.

5. The apparatus of claim 1, wherein at least one of the first translatable cylinder, the second translatable cylinder, the first threaded gear, and the second threaded gear comprises a ball screw mechanism configured to reduce frictional force within the propulsion unit.

6. The apparatus of claim 1, wherein rotation of the first and second translatable cylinders causes shear forces of the magnetic fields of the first plurality of magnets and the second plurality of magnets to interact with one another to propel the first and second translatable cylinders along the threaded shaft once the first and second threaded gears cease to be driven by the drive shaft.

7. The apparatus of claim 1, wherein the second threaded gear lacks a support structure.

8. The apparatus of claim 1, further comprising an upper protruding lip and a lower protruding lip, each of the upper protruding lip and the lower protruding lip configured to support a respective one of a pair of collars for guiding and stabilizing the propulsion unit along the threaded shaft.

9. An apparatus for actuating propulsion, comprising:
   a frame including first and second side sections and an end section;
   a first gear train positioned adjacent an interior surface of a respective one of the first and second side sections, the first gear train having a first threaded gear;
   a second gear train positioned adjacent an interior surface of an other of the first and second side sections, the second gear train having a second threaded gear;
   a drive shaft rotationally disposed in the first and second side sections, the first gear train, and the second gear train;
   a first translatable cylinder affixed to the first threaded gear, the first translatable cylinder comprising a first plurality of magnets each spaced apart from one another on a first face of the first translatable cylinder;
   a second translatable cylinder affixed to the second threaded gear, the second translatable cylinder comprising a second plurality of magnets each spaced apart from one another on a first face of the second translatable cylinder, the first face of the second translatable cylinder positioned to face the first face of the first translatable cylinder;
   a threaded shaft rotationally disposed in the first translatable cylinder and the second translatable cylinder, the threaded shaft in interlocking engagement with at least the first threaded gear and the second threaded gear; and
   wherein the first gear train and the second gear train are positioned so as to allow interaction of magnetic fields of the first plurality of magnets with magnetic fields of the second plurality of magnets in order to actuate the propulsion actuated by a mechanical input.

10. The apparatus of claim 9, further comprising a guide sleeve extending along a length of the threaded shaft.

11. The apparatus of claim 9, wherein the drive shaft is substantially parallel to the threaded shaft.

12. The apparatus of claim 9, wherein the interface between the drive shaft and each of the first and second side sections comprise a ball bearing, further wherein the interface between the first gear train and a respective one of the ball bearings includes a spacer configured to reduce friction between the first gear train and the frame.

13. The apparatus of claim 9, wherein at least one of the first translatable cylinder, the second translatable cylinder, the first threaded gear, and the second threaded gear comprises a ball screw mechanism configured to reduce frictional force within the propulsion unit.

14. The apparatus of claim 9, wherein rotation of the first and second translatable cylinders causes shear forces of the magnetic fields of the first plurality of magnets and the second plurality of magnets to interact with one another to propel the first and second translatable cylinders along the threaded shaft once the first and second threaded gears cease to be driven by the drive shaft.

15. The apparatus of claim 9, wherein the second threaded gear lacks a support structure.

16. The apparatus of claim 9, further comprising an upper protruding lip and a lower protruding lip, each of the upper protruding lip and the lower protruding lip configured to support a respective one of a pair of collars for guiding and stabilizing the propulsion unit along the threaded shaft.

17. A method for actuating propulsion, comprising:
  providing a propulsion unit, the propulsion unit comprising:
    a first translatable cylinder having a first threaded gear in interlocking engagement with a drive gear, the first translatable cylinder comprising a first plurality of magnets each spaced apart from one another on a first face of the first translatable cylinder;
    a second translatable cylinder having a second threaded gear in interlocking engagement with a gearbox, the second translatable cylinder comprising a second plurality of magnets each spaced apart from one another on a first face of the second translatable cylinder, the first face of the second translatable cylinder positioned to face the first face of the first translatable cylinder;
    and
    a threaded shaft rotationally disposed in the first translatable cylinder and the second translatable cylinder, the threaded shaft in interlocking engagement with at least the first threaded gear and the second threaded gear;
  providing a drive shaft, wherein a first end of the drive shaft is affixed to the drive gear and a second end of the drive shaft is affixed to the gearbox;
  engaging the first translatable cylinder with the drive gear;
  engaging the second translatable cylinder with the gearbox;
  and
  rotating the drive shaft, wherein rotation of the drive shaft provides a mechanical input to the first and second translatable cylinders configured to actuate the propulsion from the interaction of the first plurality of magnets with the second plurality of magnets.

* * * * *